June 24, 1958  E. F. FARRELL  2,839,826
METHOD OF MAKING HYDRODYNAMIC COUPLINGS
Filed Dec. 22, 1952

Inventor:
Eugene F. Farrell
By: [signature]  Atty.

United States Patent Office 2,839,826
Patented June 24, 1958

2,839,826

METHOD OF MAKING HYDRODYNAMIC COUPLINGS

Eugene F. Farrell, Grosse Pointe, Mich., assignor to Borg-Warner Corporation, Chicago, Ill., a corporation of Illinois Application December 22, 1952, Serial No. 327,311

1 Claim. (Cl. 29—530)

This invention relates to a method of making hydrodynamic couplings and more particularly to such couplings comprising a vaned pump and a vaned turbine, the pump including driving and vaned shell members of disk or dished-shaped form connected together to define a fluid chamber receiving the turbine, the driving member being connected to a source of power, such as an engine, for driving the pump.

In the manufacture of hydrodynamic couplings, the vanes and shell of the pump and turbine are conventionally formed of aluminum, or other light weight metal, by casting processes, such as die-casting, sand-casting, or plaster mold casting; or these vaned coupling elements may be formed of sheet metal, such as steel, by individually stamping the vanes and shell from sheet metal and assembling the same. The shell of the pump is usually connected to an annular driving member to form a fluid chamber, the driving member being of cast iron, or a stamping of sheet metal such as steel, having the inherent strength required to transfer torque from an engine to the pump. In the manufacture of sheet metal pumps, this connection can be readily made by telescoping axially extending and radially outer peripheries of the shell and driving member to overlap the outer peripheries thereof and then electrically welding the same together to provide a fluid-tight driving connection, which is of considerable value in the economical manufacture of couplings by expediting the time required to assemble the hydrodynamic coupling. However, due to the inability of electrically welding aluminum and ferrous metal, such as iron or steel, this type of connection cannot be utilized to secure an aluminum shell to a cast iron or sheet steel driving member.

It is an object of the invention to provide an improved arrangement and method for connecting a driving member and vaned shell of a hydrodynamic coupling vaned element, which member and shell are formed of dissimilar materials incapable of being united by electrical welding.

It is another object of the invention to provide a hydrodynamic coupling vaned element and method of making the same and comprising two annular dished members of dissimilar metals, such as steel and aluminum, and connecting the members together by securing a steel ring to the aluminum member and then fusing, as by welding, the steel ring to the steel member.

It is another object of the invention to provide a vaned hydrodynamic coupling element and method of making the same and comprising a steel ring secured to the aluminum shell by positioning the steel ring in a mold and then casting the aluminum member about a portion of the ring in the mold, the ring having circumferentially spaced generally radially extending openings receiving portions of the aluminum shell to securely connect the ring and shell.

A further object of the invention is to provide a vaned hydrodynamic coupling element and method of making the same and comprising a steel ring secured to an aluminum shell by heating the ring to a high temperature to alloy and fuse the steel and aluminum involving heating the ring, casting molten aluminum about a portion of the ring in a mold, and freezing the aluminum to integrally join the steel ring to the aluminum shell.

The invention consists of the novel constructions, arrangements, devices, processes and methods to be hereinafter described and claimed for carrying out the above stated objects and such other objects as will appear from the following description of certain preferred embodiments and methods for making the same illustrated with reference to the accompanying drawing, wherein:

Figure 1:
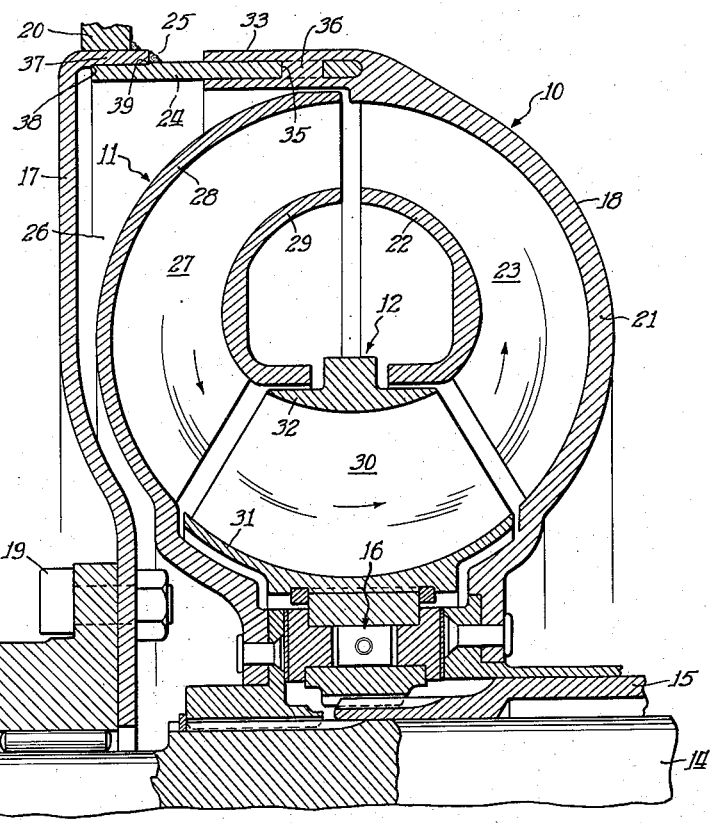
Fig. 1 is a cross-sectional view of a hydrodynamic coupling illustrating an annular member mechanically connecting a driving member and a vaned shell of a pump in accordance with one embodiment of the invention.

Referring now to the drawing, the hydrodynamic coupling there shown is of the torque conversion type and comprises three vaned elements, namely a pump 10, a turbine 11, and a stator 12. The pump 10 is secured to a drive shaft 13 coupled to a source of power, such as an engine, and the turbine 11 is connected to a driven shaft 14 for operating any desired mechanism. The stator 12 is connected to a stationary sleeve 15 through the medium of a one-way sprag type clutch 16 such as shown and designed in U. S. Patent 2,366,842 issued January 9, 1945.

The pump 10 is formed of two annular dish-shaped members 17 and 18. The member 17 drives the member 18 and is of disk or dish-like form, the member 17 being secured to the driving shaft 13 by bolts 19 and may be provided with an annular toothed band 20 surrounding and secured to its outer periphery to provide a flywheel for cooperation with the gears of a starter in the event the device is used with an internal combustion engine. The member 18 comprises a shell 21 of semi-toroidal shape and a core ring 22 of generally similar shape, the vanes 23 extending between and connected to the shell and core ring. The member 18 also includes an annular ring 24 secured to the shell at its outer periphery and extending toward the member 17; the outer periphery of the member 17 being in the form of an axially extending flange overlapping the ring 24 and being welded thereto as at 25 to form, with the shell 21, a closed fluid chamber 26 within which are disposed the turbine 11 and stator 12. The turbine 11 comprises vanes 27 extending between and connected to a shell 28 and core ring 29. The stator 12 has vanes 30 extending between and connected to a shell 31 and a core ring 32. It will be understood that the shell and core ring of each vaned element described are both annular and complete rings, although only portions of the shells and core rings are illustrated in the drawings and the vanes may be curved and of varying thickness such as those shown in U. S. Patents 2,306,758 and 2,333,680. The three vaned elements form and function as a hydrodynamic torque converter with the vanes of the pump functioning to impart energy to a body of liquid in the chamber 26 and the turbine receiving energy from the liquid to drive the shaft 14, the stator being held from rotation and functioning as a reaction element by the one-way clutch to change the direction of flow of the liquid so that the device functions to multiply torque.

The shell, vanes, and core ring of each vaned element are of aluminum and may be formed as an integral unit by die-casting, sandcasting or plaster mold casting methods conventionally employed to provide for facile and economical manufacture. The disk or dish-shaped member 17 is preferably of sheet steel for the advantage of lightness in weight while possessing the required strength for the transmission of torque and is formed by a simple stamping operation to assume the shape shown in Fig. 1.

In view of the inability to weld ferrous metal, such as iron or steel to aluminum, it has heretofore been customary to form a pump by connecting an aluminum shell and an annular steel disk or dished-shaped driving member to provide a closed fluid chamber, for example, by providing flanges extending radially outwardly of the shell and member and having aligned openings receiving bolts to secure the flanges together, a time-taking and laborious practice in assembling torque converters, and requiring expensive drilling machines to accurately locate and drill openings in the flanges. Other mechanical connections have been proposed, such as forming threads on the shell and driving member to connect the same, or screw an annular band having a thread connection with the flanges, but these connections have been complicated and proven expensive in manufacture due to the use of accurately forming the threads of large diameter requiring costly milling machines, etc., and labor for operation of the machines, in addition to assembling the driving member and shell. Furthermore, these connections require the use of sealing gaskets disposed between the shell and driving member to insure the fluid, usually under high pressure, does not leak or escape from the torque converter. These gaskets and the mating parts of the shell and driving member must not only be accurately formed but carefully assembled to prevent fluid leakage.

The present invention is particularly directed to providing a simple and relatively inexpensive manner and arrangement for connecting a driving member and vaned shell of a hydrodynamic coupling element.

As previously described, the pump shell 21, vanes 23 and core ring 22 are of aluminum and are formed by any suitable method to provide an integral unit, being preferably cast as by die-casting or sandcasting, or by the use of plaster molds, the ring 24 being mechanically connected to the shell during the casting process.

Figure 2:
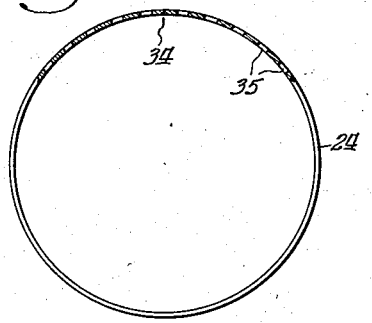
Fig. 2 is an end elevational view, partly in section, of the connecting member shown in Fig. 1.
Figure 3:
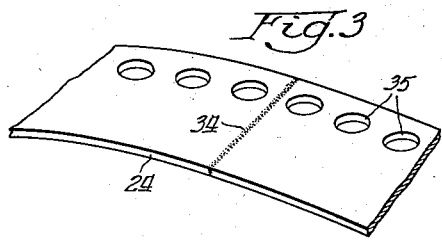
Fig. 3 is an enlarged perspective view of a portion of the connecting member.

Assuming the unitary shell, vanes, and core ring are made by the use of plaster molds, the mold is provided with the requisite and desired shapes to form the shell, vanes, and core ring, and the annular ring 24 is then partially inserted and held within the mold in the location provided therein for the formation of the annular axially extending outer periphery 33 of the pump shell. The ring may be formed by bending a flat piece of sheet steel into cylindrical form and connecting the engaged ends by a weld 34. The ring 24 being provided with a plurality of equidistantly circumferentially spaced openings 35 therethrough as shown in Figs. 2 and 3. Molten aluminum is then poured in the molds and allowed to cool to solidify the same and thereby produce the composite cast aluminum and steel structure comprising the steel ring 24, the shell 21, vanes 23 and core ring 22. During the casting process, the molten aluminum flows about the steel ring 24 and into the openings 35 in the ring so that, upon cooling, the ring is embedded in the peripheral portion 33 of the shell 10 and is securely united to the shell by the connecting portions or lugs 36 of the shell extending through the openings in the ring so that disruption by axial separation of the ring and shell, under torque transmission, is prevented. It may be noted that the circumferential spacing of the openings 35 in the ring is critical to reduce the effects caused by centrifugal force on the aluminum shell tending to force the periphery 33 of the shell outwardly causing bending movement through the radial center line of any opening and its lug. This has been determined by extensive experiments, for example, a torque converter or fluid coupling having an eleven inch (11") diameter of its fluid circuit, requires the openings 35 in the ring 24 to be spaced three-quarters of an inch (¾") apart.

The steel ring 24 is connected to the dished member 17 by providing an annular flange 37 on the outer periphery of the dished member 17 and disposing the flange in overlapping engaged relation with the steel ring 24, and thereafter welding the ring and the flanges by the weld 25, the weld extending circumferentially around the flange and ring to securely connect the dished member and the ring and provide a joint preventing leakage of the fluid in the chamber 26 exteriorly of the converter. It may be noted that the flange 37 and ring 24 are provided with shoulders 38 and 39 abutting the end edges of the ring 24 and flange 37, respectively, for positioning the shell 21 and member 17 in predetermined axially spaced relation to each other.

Torque converter pumps, as shown at 10, have been made and conclusively proven very satisfactory by tests under rigid laboratory specifications including rotation of the pump at abnormally high speeds to determine the bursting strength of the pump and also leaking of the fluid.

Figure 4:
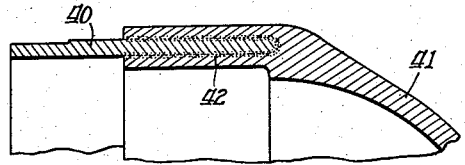
Fig. 4 is a cross-sectional view of a fragmentary portion of the vaned shell of a pump illustrating the annular connecting member and shell, of dissimilar materials, bonded together by fusion of the materials in accordance with another embodiment of the invention.
Figure 5:
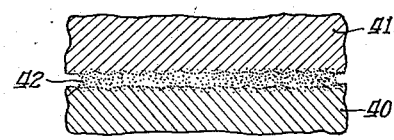
Fig. 5 is an enlarged view of the bonded portions of the annular member and shell.

Figs. 4 and 5 illustrate another embodiment of the invention contemplating the bonding of a steel ring 40 to an aluminum shell 41, having the configuration shown in Fig. 1, by a chemical union between the steel of the ring 40 and aluminum shell 41 in which there is an alloying of the steel and aluminum. The bonding of the aluminum shell and steel ring are accomplished by thoroughly cleaning the surfaces of the ring of all foreign matter, as by brushing or sandblasting, to remove scale, dirt, grease, and other material, highly heating the steel ring to a temperature at which it is capable of alloying with the molten aluminum, positioning the ring to locate one end within a die having the desired configuration of the aluminum shell, vanes and core ring, and pouring molten aluminum within the die and around the ring, and rapidly freezing the same by contacting the die with cold air or ice to abstract heat from the aluminum and to cool and freeze the aluminum and thereby solidify the same, the aluminum structure and steel ring being removed as a homogeneous assembly immediately thereafter.

It has been determined that, owing to the high temperature of the surfaces of the ring, instant bonding between it and the molten aluminum metal takes place as the result of an alloying action taking place at the interface, but the alloying action is immediately arrested by reason of the cooling of the alloying surface by the mass of cold air or ice. When the aluminum solidifies, a substantially homogeneous structure is produced, provided by the bond 42 of ferro-aluminum alloy between the ferrous metal of the ring 40 and the aluminum metal of the shell 41, which will withstand deformation, wide temperature changes and vigorous treatment. Patents 2,396,730, 2,435,991, 2,481,962 and 2,455,457 illustrate and describe in detail the process of bonding ferrous and aluminum metals and may be referred to for more descriptive and detailed information. As the bond 42 of an aluminum-ferrous alloy may contain numerous interstices which possibly would allow slight leakage of liquid under high pressure, in the torque converter, the connected steel ring and composite aluminum shell, vanes and, core ring, are immersed in a bath of sodium silicate fluid or other impregnating material, commonly known as "waterglass," and to cause the fluid to penetrate into and fill the interstices in the bond to prevent the possibility of leakage of liquid from the torque converter.

The composite structure of the steel ring 40 and shell 41 may be connected to a driving member, such as shown at 17, in the manner previously described with reference to the steel ring 24 and shell 21 assembly with the steel driving member 17 in Fig. 1.

I wish it to be understood that my invention is not to be limited to the specific construction and methods shown and described, except only as far as the claim may be so limited, as it will be apparent to those skilled in the art that changes may be made without departing from the principles of the invention.

I claim:

The method of making a fluid coupling element comprising the steps of providing an annular ferrous member; immersing the member in a bath of molten aluminum containing metal at a temperature and for a time sufficient to form a ferro-aluminum alloy film on the member, transferring the member without substantial cooling to a second bath of an aluminum containing metal at a lower temperature than the first bath to arrest further formation of the alloy immediately inserting the member partially within a mold of semi-toroidal shape and casting an aluminum containing metal in the mold and on the wetted surface of said member within the mold to form a permanent bond between the member and cast metal, and immersing the annular member and cast metal into a bath of liquid sodium silicate or other suitable impregnating material effective to penetrate into and fill the interstices in the bonded portions of said member and cast metal.

References Cited in the file of this patent

UNITED STATES PATENTS

| | | |
|---|---|---|
| 1,730,034 | Faulk | Oct. 1, 1929 |
| 1,807,689 | Deputy | June 2, 1931 |
| 1,955,156 | Udale | Apr. 17, 1934 |
| 2,123,181 | Deputy | July 12, 1938 |
| 2,216,747 | Klimek | Oct. 8, 1940 |
| 2,265,243 | McCullough et al. | Dec. 9, 1941 |
| 2,351,517 | Jandasek | June 13, 1944 |
| 2,396,730 | Whitfield et al. | Mar. 19, 1946 |
| 2,435,991 | Whitfield | Feb. 17, 1948 |
| 2,544,671 | Grane et al. | Mar. 13, 1951 |
| 2,573,940 | Von Fuchs | Nov. 6, 1951 |